June 4, 1963 R. S. WILLIS 3,092,136
FLUID PRESSURE OPERATED SHUT-OFF VALVE
Filed Nov. 23, 1959 5 Sheets-Sheet 1

INVENTOR.
ROBERT S. WILLIS
BY
Paul A. Weilein
ATTORNEY

June 4, 1963

R. S. WILLIS 3,092,136

FLUID PRESSURE OPERATED SHUT-OFF VALVE

Filed Nov. 23, 1959

INVENTOR.
ROBERT S. WILLIS

BY
Paul A. Weilein
ATTORNEY

INVENTOR.
ROBERT S. WILLIS
BY
Paul A. Weilein
ATTORNEY

June 4, 1963 R. S. WILLIS 3,092,136
FLUID PRESSURE OPERATED SHUT-OFF VALVE
Filed Nov. 23, 1959 5 Sheets-Sheet 5

INVENTOR.
ROBERT S. WILLIS
BY
Paul A. Weilein
ATTORNEY

United States Patent Office 3,092,136
Patented June 4, 1963

3,092,136
FLUID PRESSURE OPERATED SHUT-OFF VALVE
Robert S. Willis, 4341 Olive, Long Beach, Calif.
Filed Nov. 23, 1959, Ser. No. 854,940
14 Claims. (Cl. 137—458)

The present invention relates to shut-off valves, and more particularly to a shut-off valve which is adapted for but not limited to use as a shut-off valve at well heads, as for example, where oil and/or gas wells are flowing under pressure.

Heretofore, shut-off valves have been employed at well heads of producing oil and/or gas wells to automatically shut in the well, that is, to close off the flow passage through the well head, responsive to various circumstances. Such prior devices have in general, employed valves which are operated from high pressure accumulators so that valve operating fluid pressure is available at the well head to actuate the valve and overcome well pressure in the event that it should become desirable or necessary to shut the well in. Resetting of the conventional shut-off valve has for the most part been manual as by the use of a screw jack.

Among its primary objects, therefore, the present invention contemplates a fluid pressure operated shut-off valve which employs well pressure itself both to close the valve and to reset the same or open the valve, thus eliminating the need for auxiliary pressure sources such as an accumulator, and eliminating the need for manual resetting devices. In addition, the valve operates more efficiently inasmuch as it is being actuated by well pressure rather than against well pressure.

Another object of the invention is to provide a relatively compace assemblage which is easy to maintain and repair as well as to install initially at a well head. In this connection, the invention contemplates a fluid pressure operated shut-off valve which may be very simply adjusted so as to function at different pressures as circumstances may require at different well sites.

Another object is to provide a shut-off valve which responds to both high and low pressure, that is to say, pressures which exceed or fall below a predetermined range of pressures for which the shut-off valve may be set. In this connection, the high pressure actuation of the shut-off valve is a compound actuation so that the valve may be shut off by an excessive rise in well pressure on the one hand or, on the other hand, by an excessive rise in pressure in a line or level in a tank leading from the well head to a storage tank or other facility. Thus, the valve is under the control of a number of variable conditions such that it is ideally suited to the automatic control of production from a well or to remote control of production from the well, as well as to other conditions which will be apparent to those skilled in the art.

Inasmuch as the shut-off valve is actuated by well pressure, it is ideally suited to use in high pressure wells such as certain gas condensate or high volume, high pressure flowing oil wells, since high pressures do not have an adverse effect on the ease of operation of the valve, the well pressure itself being the operating pressure medium.

More particularly, it is an object of the invention to provide a shut-off valve for flowing wells wherein the shut-off valve is operated by fluid pressure derived from the well under the control of a low-pressure pilot valve, on the one hand, and a high-pressure pilot valve on the other hand, each of the pilot valves being readily adjustable so as to respond to different pressures so that the range of pressures at which the shut-off valve will remain open may be readily varied to conform to varying circumstances. In addition, extremely effective yet simple means are provided for resetting the shut-off valve once it has been closed, wherein the pressure of fluid in the well is employed to reset the shut-off valve.

Other objects and advantages of the invention will be hereinafter described or will become apparent to those skilled in the art, and the novel features of the invention will be defined in the appended claims.

In the accompanying drawings.

Like reference characters in the several views of the drawings and in the following description designate corresponding parts.

Figure 1:
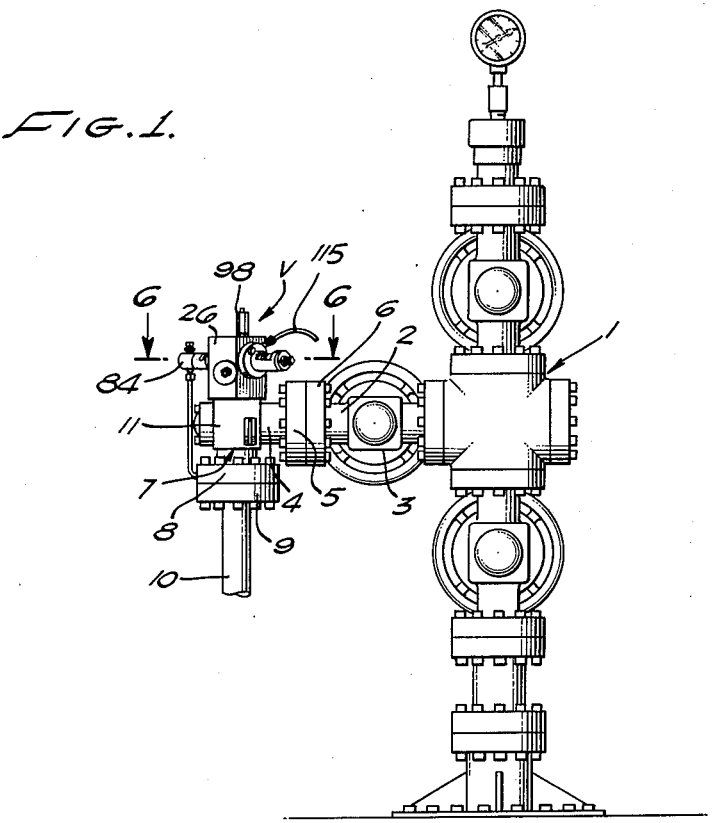
FIG. 1 is an elevational view illustrating a shut-off valve assembly in accordance with the invention as applied to a Christmas tree at a well head.

Referring to FIG. 1, a conventional form of Christmas tree generally designated 1 is shown. Such a Christmas tree is employed at a well head to control and direct the flow of production fluid through a flow line 2 in which is a valve 3. Applied to the illustrative flow line 2 is a shut-off valve assembly generally designated V, having a supporting neck 4 with a mounting flange 5 secured to a mounting flange 6 of the flow line 2. The valve assembly V also includes a discharge section 7 having a flange 8 secured to a flange 9 of a discharge line 10. Accordingly, it will be observed that well fluids flowing through the Christmas tree 1 will pass through the neck 4 of the valve assembly V and thence into discharge line 10.

Figure 3:
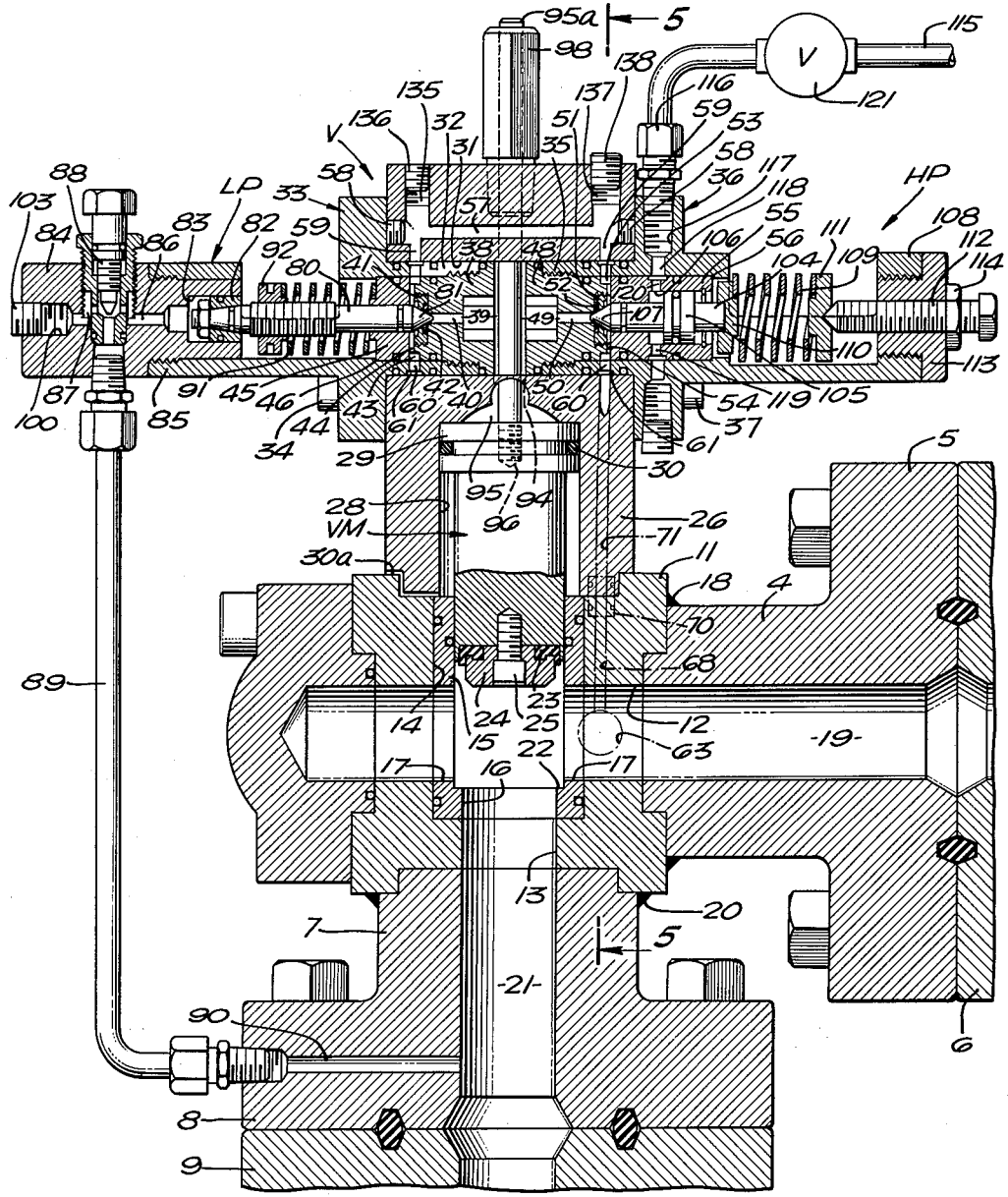
FIG. 3 is an enlarged sectional view as taken substantially on the staggered section line 3—3 of FIG. 2, so as to more particularly illustrate the cooperative and functional relationship of the parts and the fluid flow paths through the assembly, with the main or shut-off valve shown in a normal open position for permitting the flow of fluid through the device.

As is best seen in FIG. 3, the valve assembly V comprises a central support block 11 which is cross bored as at 12 and 13 and counterbored in alignment with the bore 13 as at 14. Disposed in the counterbore 14 is a liner 15 having an end port 16 leading to the bore 13 and also having a pair of diammetrically opposed ports 17, 17 aligned with the through bore 12.

The inlet neck 4 is welded as at 18 or otherwise suitably connected to or made a part of the center block 11 and is provided with an inlet passage 19 communicating with the bore 12 in the block 11. The discharge section 7 is welded as at 20 or otherwise connected to or made a part of the central block 11 and is provided with a passage 21 therethrough communicating with the bore 13.

Figure 2:
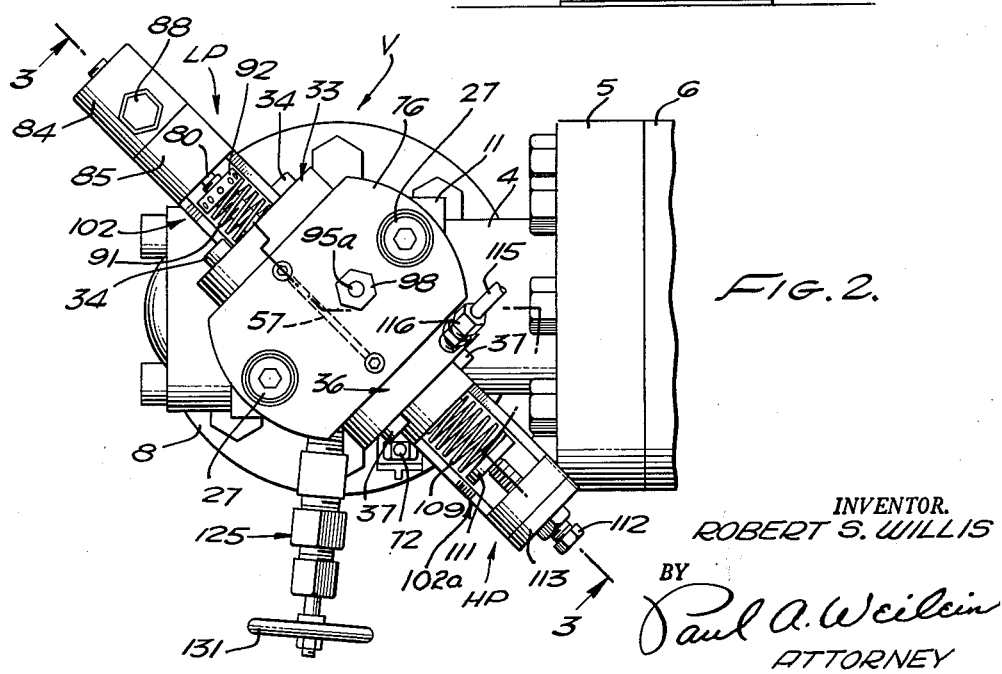
FIG. 2 is an enlarged top plan view of the shut-off valve assembly of FIG. 1.
Figure 5:
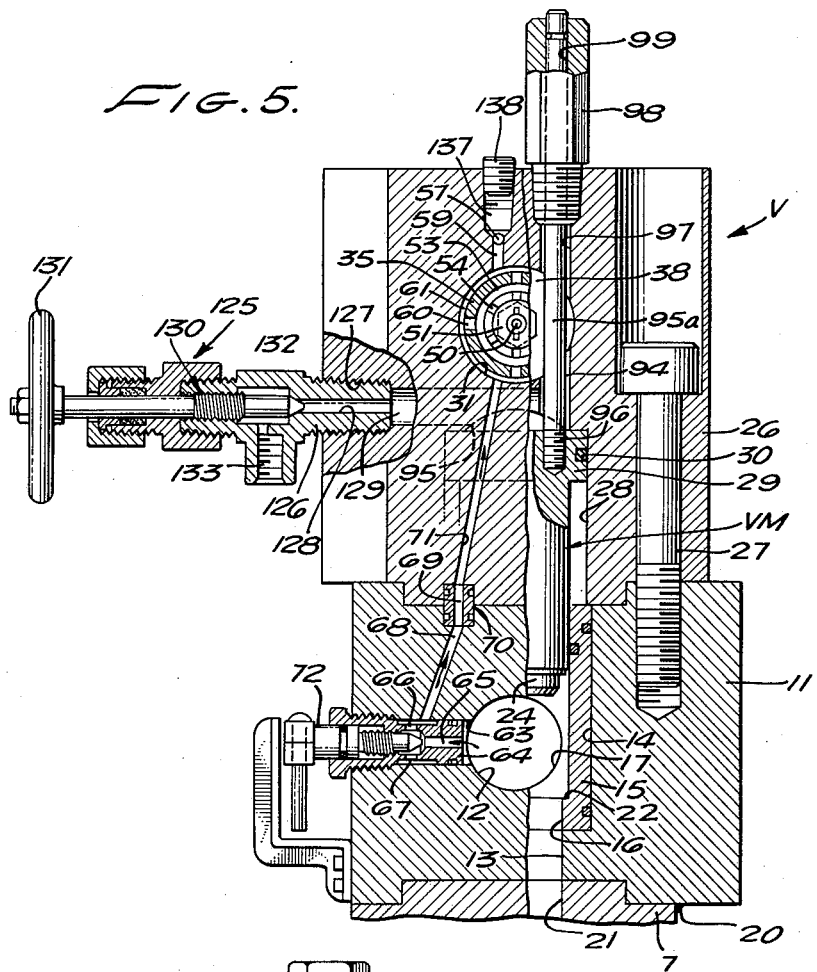
FIG. 5 is a fragentary section as taken on the plane of the line 5—5 of FIG. 3.
Figure 6:
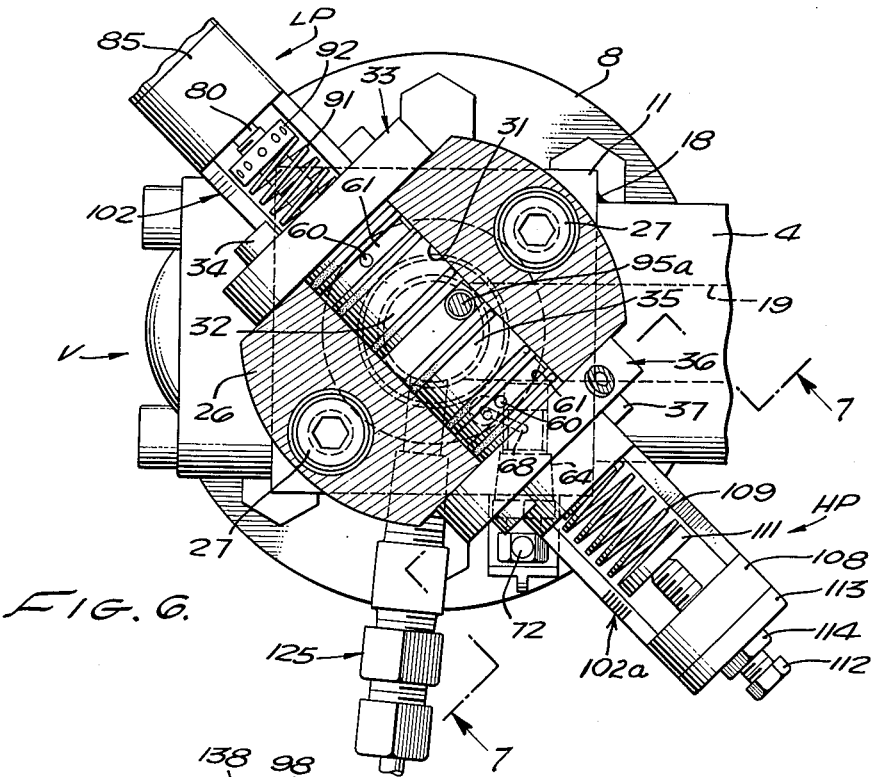
FIG. 6 is an enlarged view partly in top plan and partly in section along the line 6—6 of FIG. 1.
Figure 7:
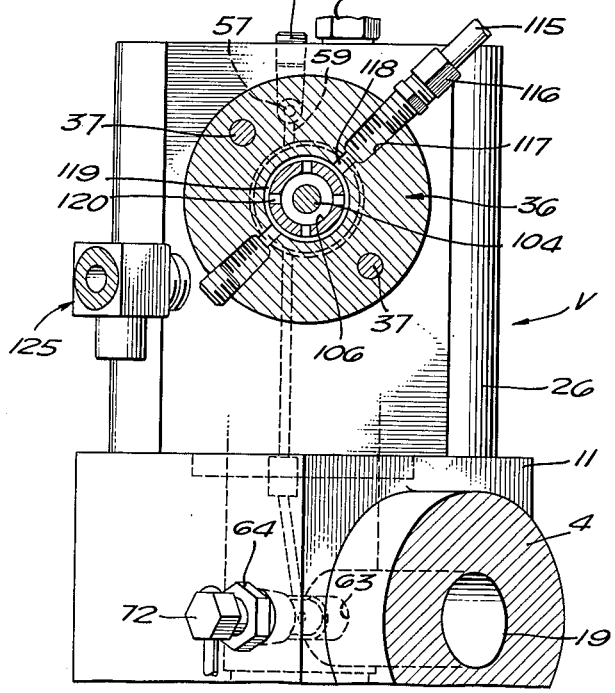
FIG. 7 is a fragmentary sectional view as taken along the line 7—7 of FIG. 6.

The liner 15 is provided with an annular shoulder 22 at its lower end constituting a valve seat engageable by one end of a main valve VM of cylindrical form which is shiftably disposed in the sleeve 15 and which has at one end a resilient valve head 23 preferably composed of Teflon or the like. The head 23 is retained on the main valve VM as by means of a retainer cap 24 and cap screw 25. It will be noted that the main valve VM projects from the sleeve 15 into a tubular body 26 which is suitably secured to the central block 11 as by screws 27 extending through the body 26 and into the central block 11 as best seen in FIGS. 2, 5 and 6. Within the body 26 is a cylinder or chamber 28 in which is slidably disposed an annular piston 29 provided at the upper end of the main valve VM, the piston 29 being sealed to the cylinder wall as by a resilient or other piston ring 30. The cylinder space lying between the piston 29 and the sleeve 15 is vented to atmosphere as by a passage 30a formed between the central block 11 and the body 26 so as to prevent the entrapment of fluid between the piston 29 and the sleeve 15 as would interfere with free motion of the main valve VM.

From the foregoing it will be apparent that the pressure of fluid passing through passage 19 in inlet neck 4 and thence into the liner 15 and from the assembly through outlet passage 21 in outlet section 27 will be imposed on the inner end of the main valve VM which has a cross sectional area substantially less than the upper end of the main valve VM which is constituted by the piston 29. Accordingly, a pressure substantially less than well pressure acting on the inner end of main valve VM when imposed upon the outer or larger end of the main valve VM will shift the main valve to seat on seat 22.

In accordance with one of the salient features of the invention, well pressure is employed to effect such movement of the valve under certain controlled conditions, as will be hereinafter more particularly pointed out. Adjacent its outer end the body 26 is provided with a bore 31. Extending into the bore 31 at one end of the latter is a cylindrical neck 32 of a low pressure pilot valve support fitting 33 which is secured to the body 26 as by cap screws 34, and extending into the bore 31 at the other end thereof is a cylindrical neck 35 of a high pressure pilot valve support fitting 36 which is secured to the body 26 as by means of cap screws 37.

Threaded into the neck 32 of the low pressure pilot valve support fitting 33 is a member 38 having at its inner end a hexagonal or other appropriate opening 39 for the reception of a tool, there being a passage 40 extending through the member 38 into the opening 39. Threaded in the outer end of the member 38 is a pilot valve seat 41 preferably having a Teflon or other suitable sealing element 42 therein, the outer extremity of the member 38 is of reduced diameter so as to provide an annular channel 43 while the end face of the member 38 is radially grooved as at 44 so that the grooves 44 communicate with the annular channel 43. The end face of member 38 abuts with an annular pilot valve stem support 45 which shoulders as at 46 in the bore through the fitting 33.

Correspondingly, there is a member 48 threaded into the neck 35 of the high pressure pilot valve support fitting 36, this member 48 also being provided with a tool receiving opening 49 in its inner end communicating with a passage 50 extending through the member 48. At its outer end the member 48 is provided with a pilot valve seat 51 also preferably having a Teflon seat 52 and as in the case of the member 38, the member 48 provides an annular channel 53 at its outer extremity and has radial passages 54 leading to the channel 53. A cylindrical high pressure pilot valve stem support 55 shoulders as at 56 in the bore in the fitting 36 and is held in place by engagement with the inner end of member 48.

In order to provide intercommunication between the annular chambers 43 and 53, the outer end of the body 26 is transversely bored as at 57 and plugged as at 58, 58 and is also longitudinally bored as at 59, 59 so as to provide passageways which establish communication between the passageway 57 and the channels 43 and 53. The passageways 59 communicate with radial passages 60, 60 extending through the necks 32 and 35 of the high and low pressure pilot valve support fittings 33 and 36, these necks also being provided with annular grooves 61, 61 to assure communication between chambers 43 and 53 and the radial passages 60, 60.

A passageway is provided so that well fluid under pressure will find access to the space between the high and low pilot valve seats and the pilot valve stem supports 45 and 55 via the passageways just described. In this connection, it will be best seen in FIG. 5 that the central block 11 is provided with a bore 63 in which is disposed a valved fitting 64 which will be hereinafter described, but which has therethrough a passage 65 leading to radial ports 66 which in turn communicate with an annular chamber 67.

The body is provided with a further passageway 68 leading from chamber 67 to a passage 69 through a fitting 70 disposed at the interface between the body 26 and the central block 11. The body 26 is provided with a passage 71 leading to the annular chamber 61 about the neck 35 of high pressure pilot valve fitting 36. Disposed in the fitting 64 referred to above is a manually operable reset valve 72 which when open as shown in FIG. 5 allows well pressure to pass through passageways 68, 69 and 71 into annular chamber 61 and thence to the space between valve seat 51, the opposing face of member 55, and via passage 57 and the passageways previously described as being in communication therewith, well pressure is also admitted into the space between valve seat member 41 and the opposing face of member 45.

Under normal operating conditions, well pressure is closed off at valve seats 41 and 51, respectively, by low pressure pilot valve means LP and high pressure pilot valve means HP which will now be described.

Low pressure pilot valve LP comprises a stem 80 having a tapered end 81 engageable in the seat 41, the stem being slidably and sealingly supported at its inner end in the member 45 and having at its outer end an annular piston 82 of greater cross sectional area than the body of the stem 80. The piston 82 is slidably disposed in a cylinder 83 formed in a fitting 84 threaded into the outer extremity of an extension 85 of the low pressure valve support fitting 33. The fitting 84 has a passageway 86 communicating with the cylinder 83 from a needle valve chamber 87 in which is disposed a needle valve assembly 88 adapted to control the flow of fluid under pressure to the cylinder 83. A conduit 89 establishes communication between the needle valve chamber 87 and a port 90 extending radially through flange 8 into discharge passageway 21 of discharge section 7. Thus, it is apparent that fluid under pressure passing through the discharge outlet 21 will effect the pressurization of cylinder 83 when needle valve 88 is open, and since the cross sectional area of piston 82 of the low pressure pilot valve is greater than the annular end area of the tapered end 81 of this pilot valve, fluid pressure in cylinder 83 will hold the valve stem 80 seated against the seat 41 so long as the pressure in the piston chamber 83 times the area of the piston 82 provides a force in excess of the opposing force provided by a coiled compression spring 91. This spring 91 provides means for varying the pressure response of pilot valve means LP and is disposed about the valve stem 80, abutting at one end with the stem support 45 and at the other end with an adjustor nut 92 which is threaded on the stem 80. By means of this adjustor nut the force of the spring acting on the stem 80 tending to open the low pressure pilot valve may be varied so that the low pressure pilot valve will automatically open when the effect of fluid pressure derived from the discharge section in cylinder 83 falls below a predetermined value.

Figure 4:
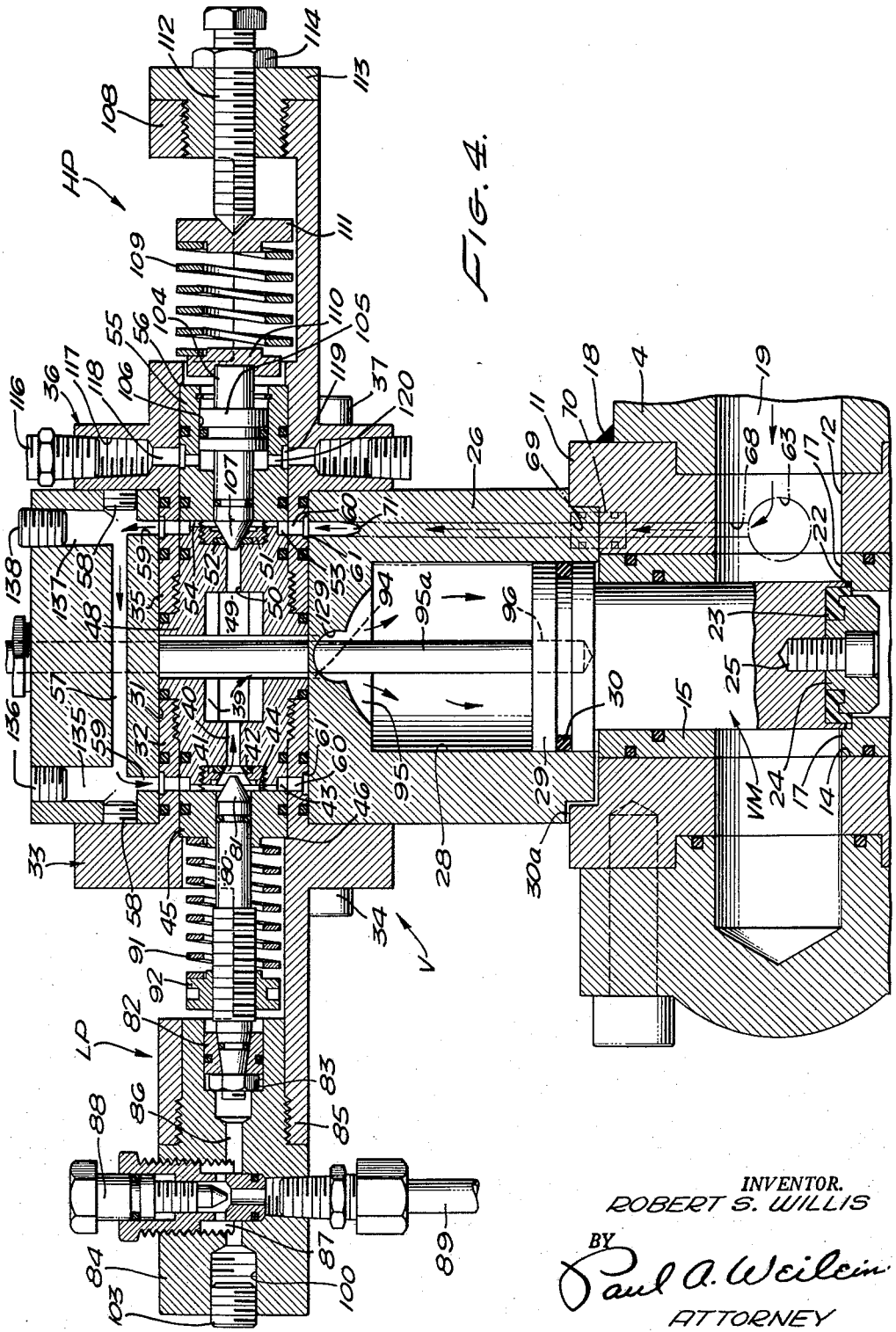
FIG. 4 is an enlarged fragmentary view corresponding to FIG. 3 but showing the main or shut-off valve in a closed position as would result from operation of the low pressure pilot valve.

In the event that pressure in the cylinder 83 drops below the predetermined value for which the low pressure pilot valve is set, and the tapered end 81 is shifted off of its seat 41, as shown in FIG. 4, then well pressure will be free to pass through port 40 and thence into the space between members 38 and 48 and thence through a passageway 94 which is best seen in FIG. 5, into the piston chamber 95 at the upper end of main valve VM. Since, as pointed out above, the piston 29 has a larger cross sectional area than the inner end of the main valve piston, it is apparent that when well pressure finds its way into the piston chamber 95, as shown by the arrows in FIG. 4, the main valve piston will be shifted from the position shown in FIG. 3 to the position shown in FIG. 4 whereat the further flow of well fluids through the assembly will be effectively precluded.

In order that an attendant may readily ascertain whether the main valve VM is open or closed, the main valve is provided with a position indicator rod 95a threaded as at 96 into the upper end of the main valve piston VM and extending upwardly through the passage 94 and thence through the space between members 38 and 48 into a bore 97 in the body 26 and through a fitting 98 threaded into the body 26 and having a bore 99 therethrough in which the position indicator is sealed. When the main valve piston VM is in the position shown in FIG. 3, then the position indicator 95 projects through the upper end of the fitting 98; whereas when the main valve piston VM is in the closed position as shown in FIG. 4, then the position indicator 95 will be retracted from view.

Figure 8:
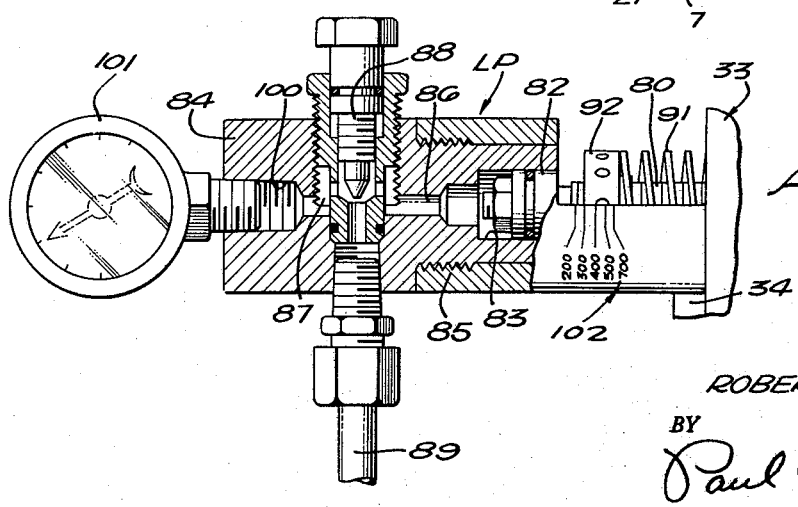
FIG. 8 is a fragmentary view partly in elevation and partly in section of the low pressure pilot valve illustrating the application of a testing pressure gage thereto.

In order to ascertain or measure a pressure at which the low pressure pilot valve stem 80 will move off its seat, it will be noted in FIG. 8 that the fitting 84 is counterbored and tapped at 100 to receive a pressure gauge 101. By the use of this pressure gauge the extension 85 of low pressure pilot valve support fitting 33 may be provided with graduations as generally indicated at 102, these graduations denoting the position of the nut 92 whereat the valve will be opened at a given pressure as designated by the graduated numerals. When the pressure gauge is not in use then a blind plug 103 may be inserted in the bore 100 as is seen in FIGS. 3 and 4.

Passing now to the high pressure pilot valve means, this pilot valve is preferably so constructed as to respond to a plurality of high pressure conditions including an abnormally high well pressure on the one hand, or high fluid level or hydrostatic head on the reservoir located remotely from the well head and the like, for example, on the other hand.

The high pressure pilot valve comprises a valve stem 104 having intermediate its ends an annular actuator piston 105 sealingly and slidably disposed in a piston chamber 106 in valve stem supporting member 55. The inner end of the stem 104 is provided with a tapered end 107 engageable with the valve seat 51 to prevent the flow of well fluids from passageway 71 through passageway 50 and thence into the upper main valve chamber 95. The pilot valve stem 104 is adjustably spring biased to its seat, and for this purpose there is disposed in an extension 108 of the high pressure pilot valve support fitting 36 a coiled compression spring 109 engaged at one end with a seat 110 which is supported on the outer end of the pilot valve stem 104, and engaged at its other end with a spring seat 111 engaged by the inner end of an adjustor screw 112. Extension 108 of fitting 36, as in the case of extension of low pressure pilot valve fitting 33, is open at its top to enable visual inspection of spring 109 and seat 111. Thus, the location of the seat 111 in the extension 108 serves as a visual indication of the selected setting of the spring force upon noting the relationship of seat 111 to a series of graduated markings generally indicated at 102a, which are formed in or otherwise applied to the extension 108 similarly as the graduations 102 are applied to low pressure pilot valve support extension 85, as shown in FIG. 8.

Adjustor screw 112 is threaded in an end plug 113 and is adapted to be locked in place as by lock nut 114 in a selected adjusted position at which the spring 109 will exert a desired closing force on the valve stem 104. The force of the spring 109 acting on the valve stem 104 may be varied depending upon the high pressure conditions under which it is desired to shut off the flow of well fluids through passage 19 and into passage 21.

As pointed out in the foregoing, response of the pilot valve 104 is preferably to a plurality of high pressure conditions. One of such conditions is the well fluid pressure which acts upon a relatively small annular area of the tapered end 107 of valve stem 104, which small annular area is exposed to well fluid pressure in the clearance space between the valve seat 51 and the opposing face of pilot valve stem support 55. Accordingly, when pressure acting upon this small annular end area of the tapered end 107 of the pilot valve stem 104 overcomes the opposite effect of the spring 109, the pilot valve stem 104 will be moved off of its seat, thus allowing fluid pressure to flow through the valve seat through passage 50, thence into recess 49 and through the space between members 38 and 48 into the upper valve chamber 95 so that the main valve piston VM will be shifted from the position shown in FIG. 3 to that shown in FIG. 4; whereupon the further flow of fluid through the valve assembly will be precluded.

In the illustrative embodiment the second pressure condition to which the pilot valve stem 104 will respond to effect closure of the main valve VM may be the level of fluid in a tank (not shown) into which fluid produced through outlet passageway 21 is being stored. Accordingly, as more particularly seen in FIGS. 1, 2, 3 and 7, a line 115 leads to a fitting 116 disposed in a threaded counterbore 117 which communicates with a radial passage 118 in the high pressure pilot valve support fitting 36. This passage 118 leads to an annular passageway 119 formed in the outer periphery of valve stem support 55, the latter having a suitable series of radial ports 120 leading from the annular passageway 119 into the piston chamber 106 between annular piston 105 and the inner end of the chamber. Accordingly, fluid pressure in the piston chamber 106 between the inner end thereof and the annular piston 105 acts across the annular piston in opposition to spring 109 so that in the event that a rise in the pressure acting in the piston chamber 106 overbalances the effect of the spring 109, the pilot valve stem 104 will be shifted away from its seat, thus to permit the flow of well fluid pressures into the upper valve chamber 95 to shift the main valve VM to a closed position as shown in FIG. 4.

Disposed in the line 115 is a valve 121 which may, if desired, be operated responsive to the level of fluid in the tank aforesaid to open line 115 so that fluid pressure from the tank does not continuously act upon the piston 105 but is imposed thereon only after the fluid level in the tank has reached a predetermined height. In this manner the varying head of fluid in the tank will not be progressively increasing the pressure acting to shift the pilot valve stem 104 off of its seat, so that well fluid pressure response of the pilot valve stem 104 will remain substantially uniform.

In accordance with another of the salient features of the invention, it is contemplated that well fluid pressure itself will be employed to reset the main valve piston VM when it is in the position shown in FIG. 4 so as to shift the main valve piston back to the position shown in FIG. 3, for example. This is accomplished by closing the previously referred to reset valve 72 shown in FIG. 5 so as to prevent the flow of well fluid pressure from passageway 12 through port 65 and into the pilot valve assembly. With the reset valve 72 in a closed position, it is then only necessary to open a bleeder valve which is best seen in FIGS. 2 and 5 and which is designated generally 125. The assembly 125 includes a fitting 126 threaded into a tapped counterbore 127 in body 26 and having a fluid passage 128 communicating with a bore 129 leading into the upper valve chamber 95. Threaded in the fitting 126 is a bleeder valve stem 130 having a handle 131 whereby the stem 130 may be rotated so as to shift the head 132 thereof off of the seat to permit the flow of fluid from the main valve chamber 95 through passage 129 and into passageway 128 and thence through bleed port 133 to atmosphere. At this time it will be apparent that the upper valve chamber 95 being bled to atmosphere, well fluid pressure acting across the inner end of the main valve piston VM will shift the same to the uppermost position shown in FIG. 3, and if the pressure condition which caused actuation of either of the high or low pressure pilot valves has been corrected, then when the bleed valve is closed and the reset valve reopened, the main valve piston will remain in the uppermost position.

In the event that the pilot valve control section of the valve apparatus hereof should be clogged with paraffin or other residue, the bleeder valve 125 may be opened and the reset valve 72 closed and fluid under high pressure may be injected into the device through an opening 135 as best seen in FIGS. 3 and 4, this opening having a threaded plug 136 therein. Thus, fluid under high pressure will be coursed through the various flow passages previously described to expel paraffin or the like therefrom. In addition, the upper end of the body 26 is provided with a second threaded passage 137 in which is a plug 138. The passage 137 is adapted to receive a pressure gauge or the like so as to determine the pressure in the body 26 which is acting on the pilot valve stem 104.

In keeping with the object of providing a shut-off valve assembly which is easy to assemble and maintain, it is notable that the high and low pressure pilot valve assemblies HP and LP may be installed in or removed from bore 31 individually and as a unit upon merely applying or removing screws 34 and/or 37, as the case may be. In addition, the entire assembly comprising body 26, main valve VM and the high and low pressure pilot valve subassemblies HP and LP may be applied to or removed from block 11 to enable assembly, replacement or repair of valve sleeve 15 and/or main valve VM, upon application or removal of screw 27.

From the foregoing, it will now be apparent that the present invention provides a high and low pressure control valve for flowing wells or the like which is not only easy to manufacture and assemble but is extremely effective in its operation inasmuch as it utilizes well fluid pressure as an operating medium both to open and close the main valve as well as an operating medium for the respective high and low pressure responsive pilot valves.

While specific structural details have been shown and described, it should be understood that changes and alterations may be resorted to without departing from the spirit of the invention as defined in the appended claims. In these claims it will be understood that the block 11 and body 26 are jointly defined as a valve housing unless otherwise more specifically defined inasmuch as main valve VM and valve sleeve 15 are carried by these parts, respectively, in the specific illustrative embodiment.

I claim:

1. A fluid pressure operated shut-off valve for wells comprising: a main valve housing; means for supporting said housing in a fluid flow line; said housing having therein a fluid passage for the flow of well fluid therethrough and a main valve chamber; a main valve shiftably disposed in said chamber for movement into said fluid passage to close off the flow of well fluid therethrough; a passageway leading from said fluid passage to the main valve chamber at the opposite side of the main valve from said fluid passage; and pilot valve means interposed in said passageway and responsive to a change in fluid pressure in the fluid passage aforesaid for opening said passageway to permit fluid from said flow passage to flow into the valve chamber and shift said main valve to a closed position; said housing having a bore therein communicating with said chamber; said pilot valve means including a pilot valve support having a portion provided with a valve seat and extending into said bore and a portion projecting from said housing, a pilot valve stem carried by said latter portion; said passageway leading into said bore through said seat; and said stem having a head engageable with said seat to close said passageway.

2. A fluid pressure operated shut-off valve for wells comprising: a main valve housing; means for supporting said housing in a fluid flow line; said housing having therein a fluid passage for the flow of well fluids therethrough and a main valve chamber; a main valve piston having a reduced diameter portion shiftably disposed in said chamber for movement of said reduced diameter portion into said fluid passage; a passageway leading from said fluid passage upstream of said main valve piston to said valve chamber at the larger end of said main valve piston; and pilot valve means for permitting the transfer of fluid pressure from said fluid passage to said valve chamber upon variation of the pressure of fluid in said fluid passage past a predetermined value; said housing having a bore therein communicating with said valve chamber at the larger end of said main valve piston; a pair of support elements having ports leading into said bore; a pair of shiftable pilot valve elements carried by said support elements having head portions for sealing said ports, respectively, upon movement of said pilot valve elements in one direction; means for urging the first of said pilot valve elements normally in said one direction; means for urging the second of said pilot valve elements normally opposite to said one direction; means for moving the first of said pilot valve elements opposite to said one direction responsive to high pressure in said passageway; and means for shifting said second pilot valve element in said one direction responsive to high pressure in said fluid passage.

3. A fluid pressure operated shut-off valve as defined in claim 2 including: reset valve means disposed in said passageway between said first pilot valve port and said fluid passage for closing said passageway; and vent valve means for venting said valve chamber at the larger end of said main valve piston, whereby fluid pressure in said fluid passage will open said main valve.

4. A fluid pressure operated shut-off valve as defined in claim 2, wherein said pilot valve means includes adjustable spring means for varying the fluid pressure response of the pilot valve means.

5. A fluid pressure operated shut-off valve comprising: a valve housing having a fluid passage therethrough; a main valve chamber in said housing; a piston shiftable in said main valve chamber to a position closing off said fluid passage; a passageway leading to said main valve chamber to conduct fluid pressure thereto; pilot valve means for controlling the flow of fluid to said valve chamber; said pilot valve means comprising a unitary subassembly including a support removably connected to said housing; said housing having an opening with which said passageway and said valve chamber communicate; said support having a portion disposed in said opening and having ports leading from said passageway to said opening; a pilot valve stem shiftably carried by said support for movements to first and second positions in which the stem closes said ports and opens said ports; a spring operatively engaged with said support and said stem to normally bias said stem to one of said positions; means for shifting said stem against said spring to the other of said positions; and shut off valve means in said passageway between said passage and said opening.

6. A fluid pressure operated shut-off valve as defined in claim 5, wherein the means for shifting said stem against said spring comprises: a piston on said stem; a member carried by said support and having a piston chamber in which said piston is shiftably disposed; and means for admitting fluid under pressure to said piston chamber.

7. A fluid pressure operated shut-off valve, comprising: a main valve housing having a fluid passage therethrough; a main valve chamber in said housing; a differential end area main valve piston shiftable in said main valve chamber to a position with the smaller end of said piston closing off said fluid passage; a passageway leading from said fluid passage upstream of said main valve to said piston chamber to impose main valve actuating pressure on the larger end of said piston; means for closing off said passageway including a pair of pilot valves; said housing having an opening extending thereacross adjacent to said piston chamber; each pilot valve comprising a support extending into said opening; a valve seat carried in said support through which said passageway extends; a pilot valve stem shiftable in opposite directions in said support into and out of engagement with said seat; means resiliently urging one stem onto its seat; means resiliently urging the other stem off of its seat; fluid pressure operated means for shifting said one stem off its seat; and fluid pressure operated means for shifting said other stem onto its seat.

8. A fluid pressure operated shut-off valve as defined in claim 7, wherein said supports terminate in spaced relation in said opening; said passageway extending into the space between said supports through each support; and said space and said piston chamber being in communication.

9. A fluid pressure operated shut-off valve as defined in claim 7, wherein the fluid pressure operated means for shifting said one stem off of its seat comprises an area at the seating end of said one stem exposed to fluid pressure in said passageway when said one stem is on its seat.

10. A fluid pressure operated shut-off valve as defined in claim 7, wherein the fluid pressure operated means for shifting said one stem off of its seat comprises: a piston on said one stem; said support for said one stem having a chamber in which said piston is disposed; and a port leading to said chamber for the admission of fluid under pressure for overcoming the means resiliently urging said one stem onto its seat.

11. A fluid pressure operated shut-off valve as defined in claim 7, wherein the fluid pressure operated means for shifting said other stem onto its seat comprises: a piston on said other stem; said support for said other stem having a chamber in which said piston is disposed; and means establishing communicaiton between said chamber and the fluid passage aforesaid through said housing.

12. A fluid pressure operated shut-off valve as defined in claim 7, including: valve means for venting said main valve piston chamber to atmosphere; and valve means for closing off said passageway.

13. A fluid pressure operated shut-off valve comprising: a valve housing having an inlet passage and a bore normal to and intersecting the inlet passage; a hollow liner in said bore having a lateral port communicating with said inlet passage and a reduced diameter shoulder at one end forming a seat; said housing having an outlet passage extending through said seat; a main valve piston having a reduced diameter body slidable in said liner into and out of engagement with said seat and a larger diameter head slidably sealed in said bore; said housing having an opening therethrough extending in a direction transverse to said bore and communicating therewith; a pair of pilot valve assemblies respectively extending into said opening in opposite directions and terminating in spaced relation with the space therebetween communicating with said bore; a passageway leading from said inlet passage upstream of said bore through each of said pilot valve assemblies into the space therebetween; one pilot valve assembly including pilot valve means for closing off said passageway upon a rise in pressure in said inlet passage above a predetermined low limit; and the other pilot valve assembly having pilot valve means for closing off said passageway upon a reduction in the pressure of fluid passing through said housing below a predetermined high limit.

14. A fluid pressure operated shut-off valve as defined in claim 13, including: valve means for venting said bore between the enlarged head of said main valve piston and said opening to atmosphere; and valve means for closing off said passageway between said inlet passage and said pilot valve assemblies.

References Cited in the file of this patent

UNITED STATES PATENTS

| | | |
|---|---|---|
| 2,412,105 | Sutton | Dec. 3, 1946 |
| 2,566,772 | Otis | Sept. 4, 1951 |
| 2,679,261 | Otis | May 25, 1954 |
| 2,834,569 | Nickerson | May 13, 1958 |
| 2,899,168 | Kleczek | Aug. 11, 1959 |
| 2,900,997 | Bostock | Aug. 25, 1959 |
| 2,993,504 | Sizer | July 25, 1961 |